| | United States Patent [19] | [11] | 4,378,603 |
|---|---|---|---|
| Eastmond | | [45] | Mar. 29, 1983 |

[54] RADIOTELEPHONE WITH HANDS-FREE OPERATION

[75] Inventor: Bruce C. Eastmond, Downers Grove, Ill.

[73] Assignee: Motorola, Inc., Schaumburg, Ill.

[21] Appl. No.: 219,765

[22] Filed: Dec. 23, 1980

[51] Int. Cl.$^3$ .......................... H04B 1/46; H04M 9/00
[52] U.S. Cl. ................................. 455/79; 179/1 VC; 179/1 HF
[58] Field of Search ....................... 455/31, 54, 78, 79; 370/32; 179/1 VC, 2 EA, 2 EB, 1 HF

[56] References Cited

U.S. PATENT DOCUMENTS

| | | |
|---|---|---|
| 2,269,565 | 1/1942 | Tillman . |
| 2,589,662 | 3/1952 | Bjornson . |
| 3,046,354 | 7/1962 | Clemeney . |
| 3,387,222 | 6/1968 | Hellwarth et al. . |
| 3,725,585 | 4/1973 | Moniak et al. . |
| 3,729,682 | 4/1973 | Elder . |
| 3,751,602 | 8/1973 | Breeden . |
| 3,889,059 | 6/1975 | Thompson et al. . |
| 3,894,187 | 7/1975 | Shibata et al. . |
| 3,906,166 | 9/1975 | Cooper . |
| 3,962,553 | 6/1976 | Linder . |
| 3,963,868 | 6/1976 | Randmere et al. . |
| 3,984,776 | 10/1976 | Stedman . |
| 4,028,627 | 6/1977 | Cho et al. . |
| 4,034,299 | 7/1977 | Cho et al. . |
| 4,037,158 | 7/1977 | Eastmond . |
| 4,052,562 | 10/1977 | Anderson . |
| 4,087,636 | 5/1978 | Akiyama et al. ................ 179/2 EA |
| 4,147,892 | 4/1979 | Miller . |
| 4,178,548 | 12/1979 | Thompson . |
| 4,243,837 | 1/1981 | Bertholon ........................ 179/1 VC |
| 4,317,959 | 3/1982 | Kuriki . |
| 4,319,086 | 3/1982 | Thompson . |

FOREIGN PATENT DOCUMENTS 2003002 2/1979 United Kingdom .

OTHER PUBLICATIONS

Fundamental Considerations in the Design of Voice-Switched Speaker-Phone, by A Busala, The Bell System Technical Journal, vol. XXXIX, 3/60, #2.
An Interphone System for "Hands-Free" Operation in High Ambient Noise, by E. L. Torick & R. G. Allen, IEEE Transactions on Audio & Electroacoustics, vol. AU-14, No. 4, Dec. 1966.
Automatic Conditioning of Speech Signals by George A. Hellwarth & Gardner D. Jones, IEEE Transactions on Audio & Electroacoustics, vol. AU-16, No. 2, Jun. 1968.
Mobile Voice Pickup System, Shure Brothers, Inc. 1977.
The Tridar Phone.
Options for Mobile Telephones by Synthesis, Inc., Fairburn, Ga.
"Portable Radiotelephone for Cellular Systems", Leitich & Linder, VTG Conference, Sep. 15-17, 1980, Dearborn, Michigan.

Primary Examiner—Jin F. Ng
Attorney, Agent, or Firm—Rolland R. Hackbart; James W. Gillman

[57] ABSTRACT

Hands-free control circuitry for a mobile radiotelephone is described that allows hands-free voice communications in a vehicular environment having a high level of ambient background noise. The hands-free control circuitry includes switches in the audio path from a microphone to the radio transmitter and the audio path from the radio receiver to a speaker, where, at all times, one audio path is closed to pass audio signal and the other audio path is open to block audio signals. The presence or absence of audio signals from the mobile party via the microphone and land party via the radio receiver is determined by separate detecting circuitry including a logarithmic amplifier, envelope detector, valley detector and summing circuitry, and comparator. Whenever the envelope of the audio signals exceeds its minima by an amount greater than a reference voltage, the detecting circuitry generates an output signal indicating that audio signals have been detected. Control logic is coupled to the output signals from the land party and the mobile party detecting circuitry for closing and opening the switches in the audio paths. One party may break-in on the other by closing his audio path and opening the other's audio path. The audio path of a speaking party is closed if the output signal from his detecting circuitry indicates that audio signals have been detected and the output signal from the other party's detecting circuitry has been absent for a predetermined time interval. The inventive hands-free control circuitry provides for fast break-in by either party, while minimizing spurious path switching. Furthermore, the hands-free control circuitry may also be utilized in landline telephone applications.

36 Claims, 3 Drawing Figures

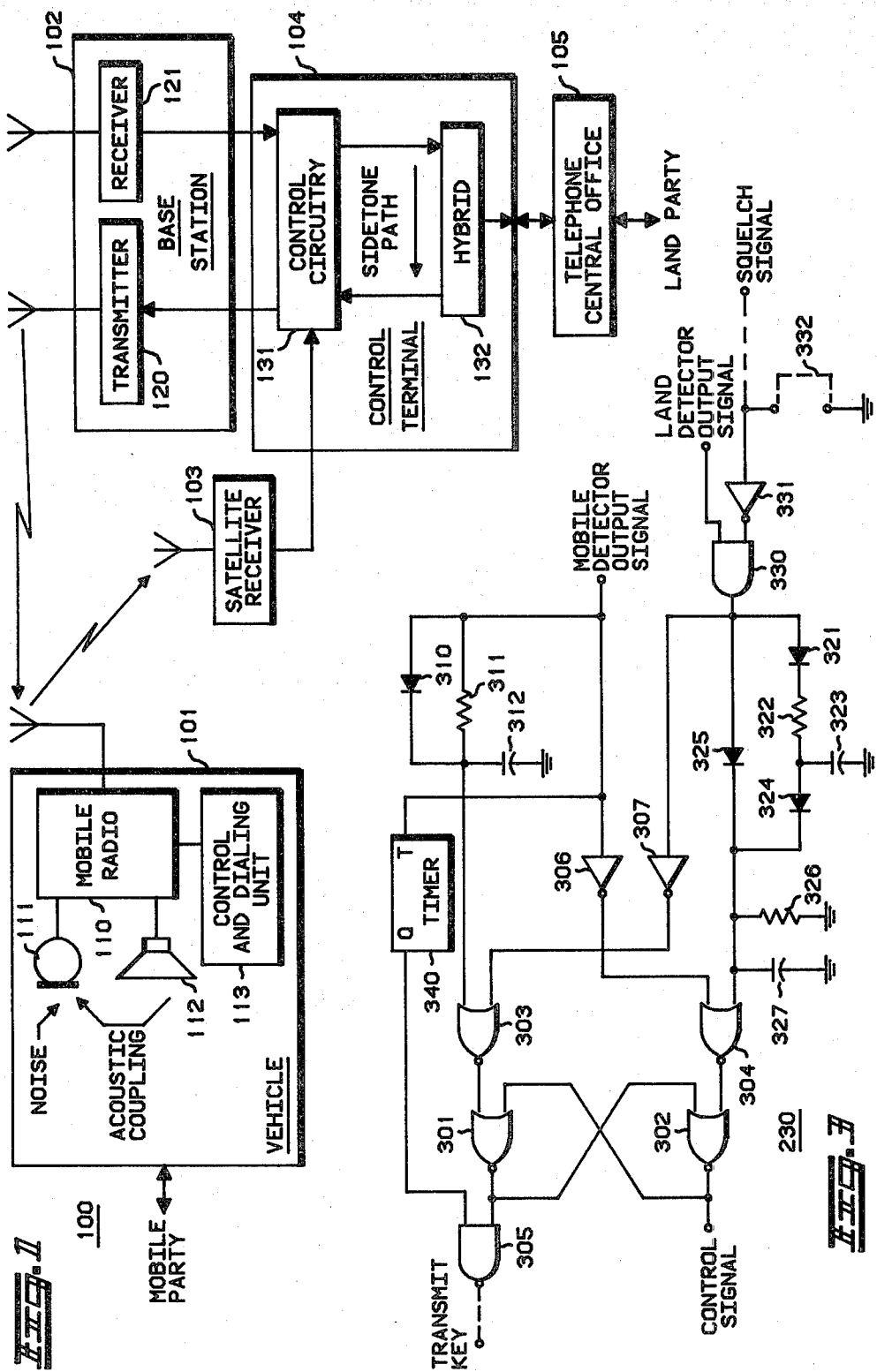

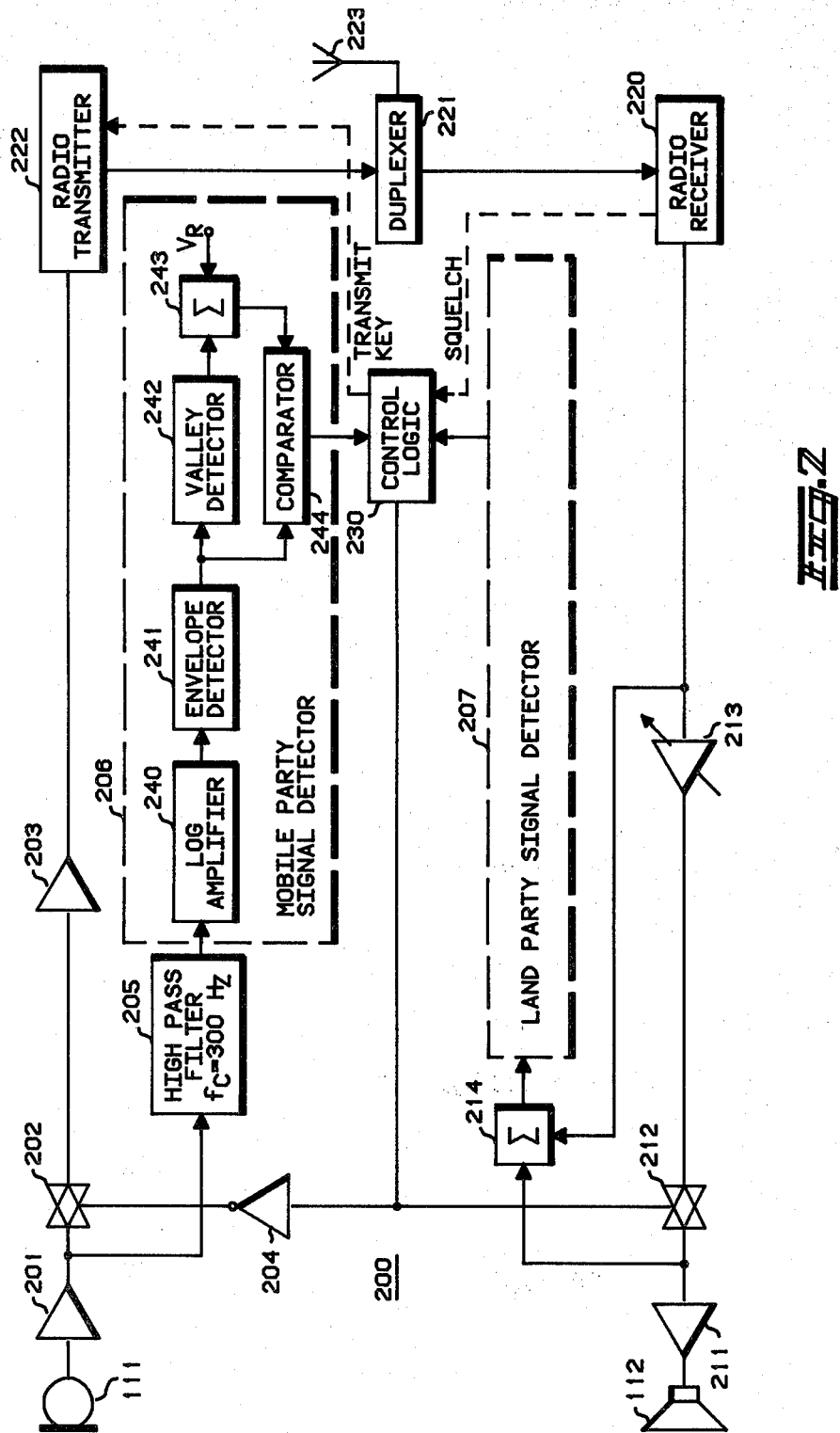

RADIOTELEPHONE WITH HANDS-FREE OPERATION

BACKGROUND ART

The present invention relates generally to mobile and portable radio systems, and more particularly to circuitry for providing hands-free operation to mobile and portable radio users in such radio systems.

In both radio and land-line telephone systems, a user communicates by means of a handset that includes a speaker at one end which is placed close to the user's ear and a microphone at the other end which is held close to the user's mouth. Thus, the user has only one free hand since the other must be used to hold the telephone handset. In order to provide a greater degree of freedom to the user, speakerphones have been developed for use in land-line telephone systems. A speakerphone is typically coupled to the telephone line and when enabled allows the user to freely move about while still communicating with another party. Such speakerphones typically compare the volume of the two parties and select the party speaking the loudest. These conventional speakerphones work well when utilized with land-line telephones, but may not operate correctly when used with a radio due to the high degree of ambient noise encountered in a vehicle. For example, a high level of ambient noise may cause such speakerphones to always select the hands-free party, totally blocking all communications from the other party.

A form of hands-free operation has been achieved in radio systems by utilizing a foot switch which both activates the radio transmitter and applies the speaker's voice signal thereto. However, whenever the hands-free party wishes to communicate, he must activate the foot switch. Thus, the hands-free party does not have complete freedom of movement as in the case of a speakerphone. Complete freedom of movement is vitally important when the hands-free party is operating a vehicle. The potential distraction caused by the necessity to activate the foot switch can result in an accident and serious personal injury. Thus, neither conventional speakerphones nor foot switch operated transmitters provide the type of hands-free operation that is necessary in a vehicular environment.

SUMMARY OF THE INVENTION

Accordingly, it is an object of the present invention to provide improved circuitry for allowing hands-free voice communications wherein the hands-free party has complete freedom of movement.

It is another object of the present invention to provide improved circuitry that allows hands-free voice communications in environments having high levels of ambient noise.

It is yet another object of the present invention to provide improved circuitry allowing hands-free voice communications between two parties where switching between the two parties is performed both automatically and equitably, such that neither party is preferred over the other.

Briefly described, the improved control circuitry of the present invention controls the application of audio signals from a communication path, such as a radio channel, to utilization circuitry, such as a speaker, and the application of audio signals from an audio signal source, such as a microphone, to the communication path. The control circuitry includes first and second delay circuitry coupled to the audio signals from the communication path and the microphone, respectively, for generating output signals indicating the presence of audio signals, each output signal indicating that audio signals are present for a predetermined time interval after the audio signals are absent. The output signals from the first and second delay circuitry are coupled to control circuitry which generates a control signal which causes first and second switching circuitry to apply either audio signals from the communication path to the speaker or audio signals from the microphone to the communication path, respectively. The control signal has a first state for applying audio signals from the microphone to the communication path when the first delay circuitry output signal indicates that audio signals from the communication path have been absent for a predetermined time interval and audio signals from the microphone are present. The second state of the control signal applies audio signals from the communication path to the speaker when the second delay circuitry output signal indicates that audio signals from the microphone have been absent for a predetermined time interval and audio signals from the communication path are present. Thus, automatic switching is provided between the audio signals from the communication path and the audio signals from the microphone when audio signals from one have been detected and audio signals from the other have been absent for a predetermined time interval.

BRIEF DESCRIPTION OF THE DRAWINGS

FIG. 1 is a block diagram of a mobile radio system that may advantageously utilize the hands-free control circuitry embodying the present invention.

FIG. 2 is a detailed block diagram of hands-free control circuitry embodying the present invention.

FIG. 3 is a detailed circuit diagram of the control logic portion of the hands-free control circuitry in FIG. 2.

DETAILED DESCRIPTION OF THE PREFERRED EMBODIMENT

In FIG. 1, there is illustrated a mobile radiotelephone system 100 that may advantageously utilize the hands-free control circuitry embodying the present invention. In conventional readiotelephone systems, such as IMTS (Improved Mobile Telephone Service) systems, a party in a vehicle 101 communicates by way of mobile radio 110 with a base station 102 which is interconnected by a control terminal 104 to a land-line telephone central office 105. The control terminal 104 includes control circuitry 131 that provides a communcation path from the base station 102 to hybrid 132 which is interconnected to a telephone line or trunk to telephone central office 105. A number dialed by the mobile party by means of control and dialing unit 113 is received by the control terminal 104 and forwarded to the telephone central office 105 on the telephone or trunk line. The telephone central office 105 receives the dialed telephone number and routes the mobile party to the desired land party. A similar process is employed when a land party dials the number of a mobile party. Furthermore, such radiotelephone systems may also include portable radios of the type described in U.S. Pat. Nos. 3,906,166 and 3,962,553. Such portable radios can be carried by the user and operated wherever he may be, for example, from his office or his vehicle. Further details of the signalling process and the nature of the circuitry for control termial 104 is provided in Motorola Service Manual 68P81028E65; for the base station 102 in Motorola Service Manual 68P81033E10; and for mobile radio 110 and control and dialing unit 113 in Motorola Service Manuals 68P81039E25, 68P81029E65 and 68P81037E85, all of which are published by Motorola Service Publications, Schaumburg, Illinois.

Such conventional radiotelephone systems may also include satellite receivers 103 which are distributed througout a large geographical area to insure that transmissions from mobile radio 110 are adequately received. Base station 102 includes a high power transmitter 120 which is centrally located in the geographical area so that transmissions therefrom can reach all mobile radios 110, in the geographical area. However, the transmissions from mobile radio 110 which has a much lower power transmitter, may not always reach the base station receiver 121, but may still be received by one of the satellite receivers 103.

In order to provide the mobile party with the same type of telephone service that a land party receives, it is necessary that each radio channel of the radiotelephone system be a duplex radio channel, having a separate transmit and separate receive frequencies. Thus, the mobile radio 110 may be simultaneously transmitting on one frequency and receiving on the other, such that both the mobile and land parties may simultaneously talk and listen. The control and dialing unit 113 typically includes a handset that is similar to handsets typically found in land-line telephone instruments. It is necessary that the mobile party hold the handset up to his ear just as a land party does. However, it would be much safer and convenient for the mobile party if the conversation during a telephone call could be achieved without the necessity of any physical actions. By utilizing the hands-free control circuitry of the present invention, the mobile party can converse with the land party for the duration of the call with no required physical action, thus freeing the mobile party of tasks which would interfere with the safe operation of the vehicle. Moreover, some states have motor vehicle regulations requiring that a mobile party stop the vehicle when dialing another party's number. This requirement is imposed to insure the safety of both the mobile party and the public, since the diversion of the mobile party's attention during the dialing process may result in an automobile accident. As a result, many new radiotelephone control and dialing units 113, such as that described in U.S. Pat. Nos. 4,122,203 and 4,220,820, provide for on-hook automatic dialing of telephone numbers stored in a memory. However, the handset must still be removed from such units for conversation. By utilizing the present invention, vehicular safety is enhanced further, since the inventive hands-free control circuitry allows the mobile party to converse without the necessity of removing one of his hands fom the steering wheel.

In order to provide for hands-free operation in vehicular applications, a separate microphone 111 and separate speaker 112 can be provided for the voice communications. Alternatively, in land-line applications, the microphone and speaker in the handset of the control and dialing unit 113 could be utilized if properly oriented with respect to the hands-free party. It is advantageous to utilize a separate microphone 111 in a vehicle in order to optimally locate microphone 111 for receiving the hands-free party's speech. By experimentation, it has been found that the best mounting location for microphone 111 in a vehicle is on the interior roof lining of the automobile either on the visor or just before the edge of the visor. These locations have been found to maximize voice pick-up while minimizing background noise pick-up. These mounting locations also provide some degree of inherent vibration damping. It has also been determined that an omni-directional electric microphone cartridge provides good performance while also being cost effective.

Referring to FIG. 2, there is illustrated a detailed block diagram of hands-free control circuitry 200 embodying the present invention. The hands-free control circuitry 200 can be located either in mobile radio 110 in FIG. 1 or in a separate equipment box utilized by conventional radiotelephones for interfacing control and dialing unit 113 with mobile radio 110.

In FIG. 2, the hands-free control circuitry 200 interfaces microphone 111 and speaker 112 to radio transmitter 222 and receiver 220, respectively. Two audio switches 202 and 212 are included which open to block or close to pass the audio signals from the microphone 111 or to the speaker 112 in response to a control signal from control logic 230. Thus, only one path is closed by audio switches 202 and 212 at any given time. In the preferred embodiment, the audio switches 202 and 212 are transientless, junction FET transistor switches. Also, each of the audio paths includes gain stages 201 and 203 in the microphone audio path and 211 and 213 in the speaker audio path. Amplifier 213 in the speaker audio path has a variable gain which may be adjusted by the mobile party for controlling the volume of speaker 112.

The audio signals in the microphone audio path are coupled from amplifier 203 to radio transmitter 222, which provides a radio signal to duplexer 221 for transmission via antenna 223. Radio signals received by antenna 223 are selectively coupled by duplexer 221 to radio receiver 220, which demodulates audio signals from the radio signal for application to amplifier 213 and summer 214 in the speaker audio path. In radiotelephone systems, radio transmitter 222 is typically enabled for the entire duration of a conversation. However, in order to conserve power in battery operated transmitters, such as those used in the portable radios described in U.S. Pat. Nos. 3,906,166 and 3,962,553, the radio transmitter 222 may be enabled by the transmit key signal only during times when the mobile or portable party is speaking. Thus, since the radio transmitter 222 may not be on during portions of the call, the base station receivers 103 and 121 require a squelch circuit, such as, for example, a squelch circuit based on detection of the presence or absence of a supervisory audio tone from the radio transmitter 222. THe mobile radiotelephone described in the aforementioned Motorola Instruction Manual 68P81039E25 and the protable radiotelephone described in an article by Albert J. Leitich and Donald L. Linder, entitled "Portable Radiotelephone for Cellular Systems", published in the Proceedings for the 30th Annual Conference of the Vehicular Technology Society, Sept. 15-17, 1980, Dearborn, Michigan. Further details of typical circuitry embodying transmitter 222, deplexer 221 and receiver 220 are provided in the aforementinoned Motorola Instruction Manuals 68P81039E25, 68P81029E65 and 68P81037E85.

The hands-free control circuitry 200 in FIG. 2 also includes a mobile party and land party signal detector 206 and 207 for detecting the presence of the mobile party voice signals and land party voice signals, respectively. If microphone 111 does not provide a high-pass response, a high-pass filter 205 may be interposed between microphone 111 and mobile party signal detector 206. The microphone signal is high-pass filtered in order to remove the vehicular background noise which is primarily concetrated at low audio frequencies. A high-pass filter having a cut off frequency of approximately 300 Hz will filter out most of this low frequency background noise. Similar high-pass filtering is typically provided in the mobile radio receiver 220. If a mobile radio receiver 220 does not include such high-pass filtering, a high-pass filter to block 205 may be added to filter the receiver signal. Furthermore, in applications that are not characterized by such low frequency background noise, high-pass filters such as block 205 will not be required in either audio path.

The mobile party and land party signal detectors 206 and 207 include substantially identical circuit blocks 240-244. Both detectors 206 and 207 are comprised of conventional circuitry including a logarithmic amplifier 240 (commonly referred to as a "soft" limiter); an envelope detector 241, a valley detector 242, a summer 243 and a comparator 244. The logarithmic amplifier 240 extends the dynamic range of the detectors 241 due to its amplification characteristic. The envelope detector 241 provides an output which follows the maxima and minima, or envelope, of the audio signals. The valley detector 242 operates as a rectifier which follows the minima of the envelope detector output. The valley detector output essentially corresponds to the steady state background noise present at the microphone 111 in the case of detector 206 or at the receiver 220 in the case of detector 207. Summer 243 adds a reference voltage $V_R$ to the valley detector output. By adding the offset voltage $V_R$ to the valley detector output, comparator 244 will not generate spurious output signals due to the presence of background noise. Thus, the comparator 244 will only provide an output signal if the envelope detector output exceeds the steady state background noise by the magnitude of the reference voltage $V_R$. The offset voltage $V_R$ is chosen together with the response characteristics of the envelope detector 241 so as to avoid generation of spurious comparator output signals due to the background noise encountered in vehichles. The output signal from comparator 244 has a high voltage level when the envelope detector output exceeds the valley detector output by the offset voltage $V_R$ and otherwise provides a low voltage level to control circuitry 230. The high voltage level from comparator 244 indicates that audio signals from microphone 111 have been detected in the case of detector 206 and that audio signals from receiver 220 have been detected in the case of detector 207.

Summer 214 applies to detector 207 a signal that is the sum of both the audio signals from FM receiver 220 and the audio signals from audio switch 212. Amplifier 213 has a variable gain control to allow the mobile party to adjust the volume of speaker 112. Thus, the signal applied by summer 214 to detector 207 varies as the volume of speaker 112 is varied. Allowing the signal level applied to detector 207 to increase as the volume of speaker 112 increases, and vice versa, helps to maintain a balance between the signal levels applied to the land party signal detector 207 and mobile party signal detector 206. As a result, the rise and fall times of detectors 206 and 207 are substantially equalized over the volume range of the speaker 112. This configuration avoids unnecessary switching between the microphone audio path and speaker audio path. In addition, with this configuration, increasing the volume of speaker 112 does not make it more difficult for the mobile party to keep the microphone audio path closed once the speaker audio path has opened.

The control logic 230 in FIG. 2 is responsive to the output signals from the mobile and land party signal detectors 206 and 207. The control circuitry 230 provides a control signal for opening and closing audio switch 212 and audio switch 202 via inverting gate 204. When audio switch 212 is opened, audio switch 202 is closed and vice versa. Control circuitry 230 may also be responsive to a squelch signal from radio receiver 220 for blocking the output signal from the land party signal detector 207 when a radio signal is not being received by receiver 220. Also, control circuitry 230 can provide a transmit key signal for turning on transmitter 222 when the mobile party is speaking.

The control circuitry 230 in FIG. 2 is illustrated in more detail in the circuit diagram in FIG. 3. In FIG. 3, the control signal for audio switches 202 and 212 is provided by a latch comprised of NOR gates 301 and 302. When NOR gate 302 has a binary one state, audio switch 212 is closed and audio switch 202 is open, and when NOR gate 202 has a binary zero state, audio switch 202 is closed and audio switch 212 is open. When the audio switches 202 and 212 are closed, they pass audio signals and when audio switches 202 and 212 are open, they block audio signals. Audio switch 202 is closed to pass audio signals fom the microphone 111 to transmitter 222 when the land party was the last active speaker, the output signal fom the land party signal detector 207 has been absent for a predetermined time interval defined by delay circuitry 321-327, and the output signal from the mobile party signal detector 206 indicates that the mobile party is speaking. Similarly, audio switch 212 is closed to pass audio signals from receiver 220 to speaker 112 when the mobile party was the last active speaker, the output signal from the mobile party signal detector 206 has been absent for a time defined by delay circuitry 310-312 and the output signal from the land party signal detector 207 indicates that the land party is speaking.

Referring to FIG. 3, NOR gate 302 will be set to a binary zero state (low voltage level) by means of a binary one state (high voltage level) from NOR gate 304. NOR gate 304 provides a binary one state at its output when both th output signal from detector 206 has a binary one state indicating that mobile party speech has been detected and the output signal from land party signal detector 207 has had a binary zero state for a predetermined time interval difined by delay circuitry 321-327. NOR gate 302 will be set to a binary one state enabling audio switch 212 when NOR gate 303 has a binary one state. NOR gate 303 provides a binary one state at its output when both the output signal from detector 207 has a binary one state and the output signal from detector 206 has had a binary zero state for a predetermined time interval defined by delay circuitry 310-312. Delay circuitry 310-312 and 321-327 both have fast charge paths provided by diodes 310 and 325, respectively. Thus, when the output signal from detector 206 changes to a binary one state, diode 310 bypasses resistor 311 so that capacitory 312 quickly charges to a high voltage level. Likewise, when the output signal from detector 207 changes to a binary one state, diode 325 bypasses resistor 322 and diodes 321 and 324 so that capacitor 327 quickly charges to a high voltage level. Both delay circuitry 310–312 ad 321–327 provide delay time intervals when discharging from a high voltage level to a low voltage level when the output signals from detectors 206 and 207, respectively, change from a binary one state to a binary zero state. Thus, according to the present invention, audio switching from one party to another, commonly referred to as break-in, may take place immediately upon detection of the speaking party if the other party's delay circuitry 310–312 or 321–327 has discharged to a low voltage level. However, if the party whose audio path is presently closed continues to speak, his delay circuitry 310–312 or 321–327 will remain charged to a high voltage level, preventing break-in by the other party.

The time intervals for the delay circuitry 310–312 and 321–327 is a compromise which relfects the conflicting requirements for fast break-in, minimal spurious path switching, and minimum degradation of operational characteristics in the presence of high background noise. A fixed time interval of approximately 250 milliseconds (ranging from 200 to 400 milliseconds) has been found to be adequate for delay circuitry 310–312 for land party break-in. Thus, in the preferred embodiment, capacitor 312 and resistor 311 have a time constant of approximately 250 milliseconds. However, the time interval for delay circuitry 321–327 has a magnitude dependent on the duration of the output signal from detector 207. In the preferred embodiment, delay circuitry 321–327 provides a short time interval of approximately 50 milliseconds for output signals from land party signal detector 207 having a short duration; and provides a longer tie interval ranging up to approximately 160 milliseconds for output signals from land party signal detector 207 having a long duration. The time interval provided by delay circuitry 321–327 will, therefore, be between a minimum of 50 milliseconds and maximum of 160 milliseconds. For example, the time interval provided by the delay circuitry 321–327 can be proportional to the duration of the output signal from land party signal detector 207 over the range from 50 milliseconds to 160 milliseconds. In general, the time interval of delay circuitry may vary from 10 to 200 milliseconds. A predetermined minimum amount of delay, such as 10 to 50 milliseconds, is always necessary to avoid spurious audio path switching at the cessation of either party's speech due to the signal delay through the control terminal 104 and telephone central office 105. In the preferred embodiment, capacitor 327 and resistor 326 have a time constant of approximately 50 milliseconds, while capacitor 323 and resistor 322 have a time constant of approximately 160 milliseconds.

The foregoing features of the present invention facilitate closing of the microphone audio path by the mobile party when the radio signal received by radio receiver 220 in FIG. 2 experiences multi-path fading. During multi-path fading, the receiver 220 may produce short bursts of land party speech as the radio signal fades in and out. If these bursts are relatively short, the mobile party may still be able to close the microphone audio path when he wishes to talk, since the time interval of the delay circuitry 221–227 is rather short in this case.

According to another feature of the present invention, a squelch signal from radio receiver 220 in FIG. 2 can be utilized to block the output signal from detector 207 by way of inverting gate 331 and AND gate 330 in FIG. 3. The squelch signal has a binary one state for causing AND gate 330 to block the output signal from detector 207 when a radio signal is not being received by radio receiver 220, and the squelch signal has a binary zero state for causing AND gate 330 to pass the output signal from detector 207 when a radio signal is being received by radio receiver 220. If receiver 220 does not provide a squelch signal, jumper 332 may be used to ground the input to inverting gate 331 for causing AND gate 330 to continually pass the output signal from detector 207. The squelch signal is used to prevent bursts of noise from receiver 220, which may be detected by the land party signal detector 207 in the same manner as a legitimate land party voice signal, from blocking attempts by the mobile party to close the microphone audio path.

According to yet another feature of the present invention, the control circuitry 230 in FIG. 3 can provide a transmit key signal to the radio transmitter 222 in FIG. 2. In FIG. 3, the transmit key signal provided by NAND gate 305 has a binary zero state to enable the radio transmitter 222 when NOR gate 301 has a binary one state and the Q output of timer 340 has a binary one state. NOR gate 301 has a binary one state when the microphone audio path is closed. Timer 340 may be a conventional monostable multivibrator that is triggered by high going transitions of the output signal from detector 206, indicating that mobile party speech has been detected. The time duration of timer 240 should be selected to be at least 500 milliseconds for bridging the gap between successive words.

The logic circuit elements 301–307, 330, 331 and 340 in FIG. 3 may be mechanized by utilizing the circuit elements in conventional integrated circuits, such as the CMOS integrated circuits described in the "CMOS Integrated Circuits Book", published by Motorola Semiconductor Products, Inc., Austin, Texas, 1978.

The hands-free control circuitry of the present invention may be advantageously utilized in a wide variety of applications requiring that a party have complete freedom of movement. Thus, the hands-free control circuitry of the present invention can be utilized to provide hands-free communications to a mobile party in mobile radiotelephone systems and also to a land party in landline telephone systems. The present invention can provide for hands-free communications in environments that have a high level of ambient background noise. Furthermore, the inventive hands-free control circuitry provides for fast break-in by either party, while minimizing spurious audio path switching.

I claim:
1. Circuitry for controlling the application of audio signals from a communication path to utilization means and the application of audio signals from an audio signal source to the communication path, comprising:

first delay means for generating an output signal having a first predetermined state whenever the audio signals from the communication path are present and having a second predetermined state a predetermined time interval after the audio signals from the communication path are absent;

second delay means for generating an output signal having a first predetermined state whenever the audio signals from the audio signal source are present and having a second predetermined state a predetermined time interval after the audio signals from the signal audio source are absent;

control means for generating a control signal having a first predetermined state in response to the second predetermined state of the first delay means output signal and the presence of the audio signals from the audio signal source and having a second predetermined state in response to the second predetermined state of the second delay means output signal and the presence of audio signals from the communication path;

first switching means responsive to the first predetermined state of the control signal for applying audio signals from the audio signal source to the communication path; and second switching means responsive to the second predetermined state of the control signal for applying audio signals from the communication path to the utilization means.

2. The control circuitry according to claim 1, further including:

first means for detecting the presence of audio signals from the communication path and generating an output signal having a first predetermined state when audio signals are present and a second predetermined state when audio signals are absent; and second means for detecting the presence of audio signals from the audio signal source and generating an output signal having a first predetermined state when audio signals are present and a second predetermined state when audio signals are absent; and said first delay means responsive to the first detecting means output signal for generating an output signal having a first predetermined state whenever the first detecting means output signal has the first predetermined state and having a second predetermined state a predetermined time interval after the first detecting means output signal has the second predetermined state;

said second delay means responsive to the second detecting means output signal for generating an output signal having a first predetermined state whenever the second detecting means output signal has the first predetermined state and having a second predetermined state a predetermined time interval after the second detecting means output signal has the second predetermined state; and said control means for generating a control signal having a first predetermined state in response to the second predetermined state of the first delay means output signal and the first predetermined state of the second detecting means output signal and having the second predetermined state in response to the second predetermined state of the second delay means output signal and the first predetermined state of the first detecting means output.

3. The control circuitry according to claim 2, further including filtering means interposed between the audio signal source and the second detecting means for filtering audio signals therebetween.

4. The control circuitry according to claim 3 further including second filtering means interposed between the communication path and the first detecting means for filtering audio signals therebetween.

5. The control circuitry according to claim 2, 3, or 4 wherein said first and second detecting means each further include means for dynamically detecting the minima of the audio signals and means for comparing the detected minima to the audio signals and generating the first predetermined state of the respective output signals when the audio signal are greater than the detected minima and the second predetermined state of the respective output signals when the audio signals are less than the detected minima.

6. The control circuitry according to claim 5, wherein said first and second detecting means each further include summing means interposed between the minima detecting means and the comparing means for summing the detected minima and a predetermined reference signal to provide a summed signal, the summed signal being compared to the audio signals by the comparing means.

7. The control circuitry according to claim 6, wherein said first and second detecting means each further include envelope detecting means for generating an output signal having a magnitude proportional to the envelope of the audio signals and applying the output signal therefrom to the minima detecting means and comparing means.

8. The control circuitry according to claim 7, wherein said first and second detecting means each further include logarithmic amplifying means for logarithmically amplifying the audio signals and applying the logarithmically amplified audio signals to the envelope detecting means.

9. The control circuitry according to claim 1, 2, 3 or 4 wherein said control means includes latching means for storing the control signal.

10. The control circuitry according to claim 2, 3 or 4 adapted for use with a radio signal communication path, radio signal transmitting means for transmitting a radio signal carrying audio signals and radio signal receiving means for receiving a radio signal carrying audio signals, said control means controlling the application of audio signals received by the receiving means to the utilization means and the application of audio signals from the audio signal source to the transmitting means.

11. The control circuitry according to claim 10, wherein the transmitting means is enabled by a first predetermined state of a transmit key signal and disabled by a second predetermined state of the transmit key signal, said control means further including means for generating the transmit key signal having the first predetermined state in response to both the second predetermined state of the control signal and the first predetermined state of the second output signal and otherwise having a second predetermined state.

12. The control circuitry according to claim 10, wherein the radio signal receiving means includes means for generating a squelch signal having a first predetermined state when a radio signal is present and having a second predetermined state when a radio signal is absent, said control means further including means interposed between said first detecting means and said control means for combining the squelch signal and the first detecting means output signal and providing to the control means an output signal having a second predetermined state when the squelch signal has the second predetermined state and the same state as the first detecting means output signal when the squelch signal has the first predetermined state.

13. The control circuitry according to claim 11, wherein the control means further includes timing means interposed between the second detecting means and the transmit key generating means and generating an output signal in response to the first predetermined state of the second output signal having a first predetermined state for a predetermined time interval and otherwise having a second predetermined state, said transmit key generating means generating the transmit key signal having the first predetermined state in response to both the second predetermined state of the control signal and the first predetermined state of the output signal from the timing means.

14. The control circuitry according to claim 10, wherein the first delay means includes means for varying the time interval provided thereby substantially in proportion to the duration of the audio signals from the communication path.

15. The control circuitry according to claim 14, wherein the time interval of the first delay means varies between ten (10) and two hundred (200) milliseconds.

16. The control circuitry according to claim 15, wherein the time interval of the second delay means is at least two hundred (200) milliseconds.

17. The control circuitry according to claim 2, 3 or 4, further including amplifying means interposed between the communication path and the first switching means for amplifying the audio signals therebetween by a predetermined amplification factor, and means for summing the audio signals from the communication path and second switching means for application to the first detecting means.

18. The control circuitry according to claim 17, further including means for varying the amplification factor provided by the amplifying means.

19. The control circuitry according to claim 1, 2, 3 or 4 wherein the first delay means includes means for varying the time interval provided thereby substantially in proportion to the duration of the audio signals from the communication path.

20. The control circuitry according to claim 19, wherein said time interval varying means varies the time interval of the first delay means between ten (10) and two hundred (200) milliseconds.

21. The control circuitry according to claim 20, wherein the time interval of the second delay means is at least two hundred (200) milliseconds.

22. The control circuitry according to claim 1,2,3 or 4, wherein the second delay means includes means for varying the time interval provided thereby substantially in proportion to the duration of the audio signals from the audio signal source.

23. The control circuitry according to claim 22, wherein said time interval varying means varies the time interval of the second delay means between ten (10) and two hundred (200) milliseconds.

24. Circuitry for controlling the application of audio signals received by a radio signal receiver from a radio channel to a speaker and the application of audio signals from a microphone to a radio signal transmitter for transmission on the radio channel, said radio receiver having a predetermined audio passband, said control circuitry comprising:

first means for detecting the presence of audio signals from the radio signal receiver and generating an output signal having a first predetermined state when audio signals are present and a second predetermined state when audio signals are absent;

means for filtering the audio signals from the microphone;

second means for detecting the presence of filtered audio signals from the filtering means and generating an output signal having a first predetermined state when audio signals are present and a second predetermined state when audio signals are absent;

first delay means responsive to the first output signal for generating an output signal having a first predetermined state whenever the first detecting means output signal has the first predetermined state and having a second predetermined state a predetermined time interval after the first detecting means output signal has the second predetermined state;

second delay means responsive to the second output signal for generating an output signal having a first predetermined state whenever the second detecting means output signal has the first predetermined state and having a second predetermined state a predetermined time interval after the second detecting means output signal has the second predetermined state;

control means for generating a control signal having a first predetermined state in response to the second predetermined state of the first delay means output signal and the first predetermined state of the second detecting means output signal and having a second predetermined state in response to the second predetermined state of the second delay means output signal and the first predetermined state of the first detecting means output;

first switching means responsive to the first predetermined state of the control signal for applying audio signals from the microphone to the radio signal transmitter; and second switching means responsive to the second predetermined state of the control signal for applying audio signals from the radio signal receiver to the speaker.

25. The control circuitry according to claim 24, wherein the first delay means includes means for varying the time interval provided thereby substantially in proportion to the duration of the audio signals from the radio signal receiver.

26. The control circuitry according to claim 25, wherein the said time interval varying means varies the time interval of the first delay means between ten (10) and two hundred (200) milliseconds.

27. The control circuitry according to claim 24 or 26, wherein the time interval of the second delay means is at least two hundred (200) milliseconds.

28. The control circuitry according to claim 24, wherein the radio signal transmitter is enabled by a first predetermined state of a transmit key signal and disabled by a second predetermined state of the transmit key signal, said control means further including means for generating a transmit key signal having the first predetermined state in response to both the second predetermined state of the control signal and the first predetermined state of the second output signal and otherwise having a second predetermined state.

29. The control circuitry according to claim 28, wherein the radio signal receiver includes means for generating a squelch signal having a first predetermined state when a radio signal is present and having a second predetermined state when a radio signal is absent, said control means further including means interposed between said first detecting means and said control means for combining the squelch signal and the first detecting means output signal and providing to the control means an output signal having a second predetermined state when the squelch signal has the second predetermined state and the same state as the first detecting means output signal when the squelch signal has the first predetermined state.

30. The control circuitry according to claim 28 wherein the control means further includes timing means interposed between the second detecting means and the transmit key generating means and generating an output signal in response to the first predetermined state of the second output signal having a first predetermined state for a predetermined time interval and otherwise having a second predetermined state, said transmit key generating means generating the transmit key signal having the first predetermined state in response to both the second predetermined state of the control signal and the first predetermined state of the timing means output signal.

31. The control circuitry according to claim 24, further including amplifying means interposed between the radio signal receiver and the first switching means for amplifying the audio signals therebetween by a predetermined amplification factor and means for summing the audio signals from the communication means and second switching means for application to the first detecting means.

32. The control circuitry according to claim 31, further including means for varying the amplification factor provided by the amplifying means.

33. The control circuitry according to claim 24, wherein said first and second detecting means each further include logarithmic amplifying means for logarithmically amplifying the audio signals, envelope detecting means for generating an output signal having a magnitude proportional to the envelope of the signals from the logarithmic amplifying means, valley detecting means for dynamically detecting the minima of the signals from the envelope detecting means, means for summing the detected minima from the valley detecting means and a reference voltage, and means for comparing the signals from the summing means and the signals from the envelope detecting means and generating the first predetermined state of the respective detecting means output signal when the envelope detecting means signals are greater than the summing means signals and generating the second predetermined state of the respective detecting means output signal when the envelope detecting means signals are less than the summing means signals.

34. The control circuitry according to claim 24, wherein the second delay means includes means for varying the time interval provided thereby substantially in proportion to the duration of the audio signals from the microphone.

35. The control circuitry according to claim 34, wherein said time interval varying means varies the time interval of the second delay means between ten (10) and two hundred (200) milliseconds.

36. A method for controlling the application of audio signals from a communication path to utilization means and the application of audio signals from an audio signal source to the communication path, said method comprising the steps of:

generating a first output signal having a first predetermined state whenever the audio signals from the communication path are present and having a second predetermined state a predetermined time interval after the audio signals from the communication path are absent;

generating a second output signal having a first predetermined state whenever the audio signals from the audio signal source are present and having a second predetermined state a predetermined time interval after the audio signals from the signal source are absent;

generating a control signal having a first predetermined state in response to the second predetermined state of the first output signal and the presence of the audio signals from the audio signal source and having a second predetermined state in response to the second predetermined state of the second output signal and the presence of audio signals from the communication path;

applying audio signals from the audio signal source to the communication path in response to the first predetermined state of the control signal; and applying audio signals from the communication path to the utilization means in response to the second predetermined state of the control signal.

* * * * *

UNITED STATES PATENT AND TRADEMARK OFFICE
CERTIFICATE OF CORRECTION

PATENT NO. : 4,378,603

DATED : March 29, 1983

INVENTOR(S) : Bruce C. Eastmond

It is certified that error appears in the above—identified patent and that said Letters Patent is hereby corrected as shown below:

Column 8, line 66 (Claim 1) change "signal audio source" to --audio signal source--

Column 9, line 45 (Claim 2) change "a" to --the--

Signed and Sealed this

Fourteenth Day of June 1983

[SEAL]

Attest:

DONALD J. QUIGG

Attesting Officer

Acting Commissioner of Patents and Trademarks